United States Patent [19]

Rugis et al.

[11] Patent Number: 4,607,719
[45] Date of Patent: Aug. 26, 1986

[54] ALCOHOL DETECTION DEVICE

[75] Inventors: John W. Rugis; Graham J. Drummond, both of Auckland, New Zealand

[73] Assignee: Drummond and Relph Limited, Auckland, New Zealand

[21] Appl. No.: 683,670

[22] Filed: Dec. 19, 1984

[30] Foreign Application Priority Data

Dec. 21, 1983 [NZ] New Zealand .................. 206266

[51] Int. Cl.[4] .......................................... B60K 28/02
[52] U.S. Cl. ................................. 180/272; 128/719; 340/576
[58] Field of Search .................. 180/272, 271; 340/53, 340/576; 128/719, 724

[56] References Cited

U.S. PATENT DOCUMENTS

| | | | |
|---|---|---|---|
| 3,780,311 | 12/1973 | Brown | 340/53 |
| 3,815,087 | 6/1974 | Hirano et al. | 340/576 |
| 3,818,899 | 6/1974 | Venema | 128/719 |
| 3,823,382 | 7/1974 | Gaddy | 340/576 |
| 3,824,538 | 7/1974 | Slemp | 340/53 |
| 3,838,971 | 10/1974 | Albertson | 128/719 |
| 3,855,573 | 12/1974 | Honda et al. | 340/576 |
| 4,248,245 | 2/1981 | Kempin | 340/576 |
| 4,316,380 | 2/1982 | Heim et al. | 128/719 |

FOREIGN PATENT DOCUMENTS 516365 5/1981 Australia .................. 180/272

*Primary Examiner*—John J. Love
*Assistant Examiner*—Eric Culbreth
*Attorney, Agent, or Firm*—Hill, Van Santen, Steadman & Simpson

[57] ABSTRACT

An alcohol detection device for controlling the ignition circuit of a vehicle. The device incorporates an alcohol sensor (10) within an open ended body (21) to enhance evaporation of condensation within the body (21). Also mounted in the body (21) is a breath pressure operative switch (25) to operate in conjunction with the sensor (10). The outputs from the sensor (10) and the switch (25) are fed to an electronic latching circuit (19) controlling a short provided on a vehicle's ignition circuit. An intending driver exhales into the body (21) a sufficient amount to activate the pressure switch (25) and in so doing provide a breath sample for the sensor (10). A time delay circuit (16) is preferably provided whereby the pressure switch (25) must be closed for a time period commensurate to that of the timer (16) to provide an output signal to the latching circuit (19).

5 Claims, 2 Drawing Figures

ALCOHOL DETECTION DEVICE

This invention relates to an alcohol detection device and in particular such a device with associated electronic circuitry to control the mode, operative or otherwise, of an ignition circuit of a vehicle's prime mover. The device is particularly intended for use on automobiles or other road user vehicles to prevent or at least limit use of the vehicle by alcoholically intoxicated drivers.

It is well established that numerous traffic accidents involve and in particular are caused by drivers intoxicated by alcohol. An object of this invention is to provide a device which will detect the presence or otherwise of alcohol and if "alcohol free" conditions are not present maintain an ignition circuit of a vehicle's prime mover inoperative. Within this specification the term "alcohol free" is used to conveniently describe conditions where there is complete absence of alcohol and also conditions where alcohol may be present but at a level below a level at which appropriate authorities have deemed as being the maximum permissable alcohol level for an operator of a vehicle. Again, while this level may vary from one place to another they are well established at least as regards road vehicles such as automobiles.

BACKGROUND OF THE INVENTION

Various devices have been proposed to achieve the object of demobilizing a vehicle if the intending driver is intoxicated and thus "alcohol free" conditions are not present. Various such devices are taught in U.S. Pat. Nos. 3,855,573 3,815,087 3,824,538 3,823,382 and other U.S. Pats. recorded as references in one or more of the above U.S. Patents. In addition there is Australian Letters Patent No. 516365. A limitation that arises from such known devices is the inconvenience that can result in using a vehicle equipped therewith and accordingly, as a matter of choice, tends to be unacceptable. The inconvenience and/or unacceptability arises not only from the integrity of the device in fulfilling its role but also from the necessity of having to use the device at times when there is no likelihood of an intending driver being intoxicated. As a general rule such conditions prevail for a substantial period of time during which a vehicle is likely to be used. A further object of this invention is to provide a device which will overcome this problem or at least reduce it to a level so as to render the device acceptable or at least not particularly inconvenient to use.

Further problems arise with known devices as regards their sensitivity or lack of sensitivity. In the former case the presence of alcohol in the ambient air can render a device susceptible to spurious operation. On the other hand if a device is lacking in sensitivity considerable exhalation may be required from an intending user before the device has sufficient input to make the selection required of it. The device of Australian Patent 516365 has attempted to overcome this problem by providing that the alcohol sensor thereof is normally isolated from the ambient air. An air pressure operated sealing unit must be activated by a user's exhalation before the sensor is exposed to a breath sample.

Such an approach can lead to another problem associated with known devices being that of condensation and more particularly the desirability of achieving ready evaporation of condensation. Residual condensation can result in a false reading and/or delay while sufficient evaporation takes place to revert to a normal stable state.

Further, as a general rule, available alcohol sensors are susceptible to change resulting from change in ambient temperature and/or ambient humidity. This can render the threshold point associated with the sensor in determining "alcohol free" breath or otherwise inconsistent and thus the reliability of the device can be called into question.

A further object of this invention is to limit the problems associated with humidity and temperature whether they be those arising from instant use and/or from ambient conditions.

BRIEF SUMMARY OF THE INVENTION

According to a first broad aspect of the invention there is provided an alcohol detection device comprising an open ended body defining an interior chamber with one end of the body forming an inlet and the other end forming an outlet, an alcohol sensor having an electrically compatable output mounted in the interior chamber of the body and a fluid pressure operative switch mounted in a section of the chamber between the inlet and the sensor as will operate at a pre-selected fluid pressure within that section of the chamber.

According to a second broad aspect of this invention there is provided a vehicle ignition control circuit comprising an alchol detection device having an open ended body with one end forming an inlet and the other end forming an outlet, an alcohol sensor having an electrically compatable output mounted partway along the interior chamber of the body and a fluid pressure operative switch mounted in the chamber between the inlet and the sensor as will operate at a pre-selected fluid pressure in that part of the chamber, the output of the sensor and the switch being connected to a pair of comparators having a common output thereof connected to ignition circuit latching means whereby if the sensor detects alcohol the output of the comparators will not provide an operating signal to the latching means as to clear an ignition circuit controlled thereby.

BRIEF DESCRIPTION OF THE DRAWINGS

In further describing the invention reference is made to the accompanying drawings wherein.

DETAILED DESCRIPTION OF THE INVENTION

Figure 1:
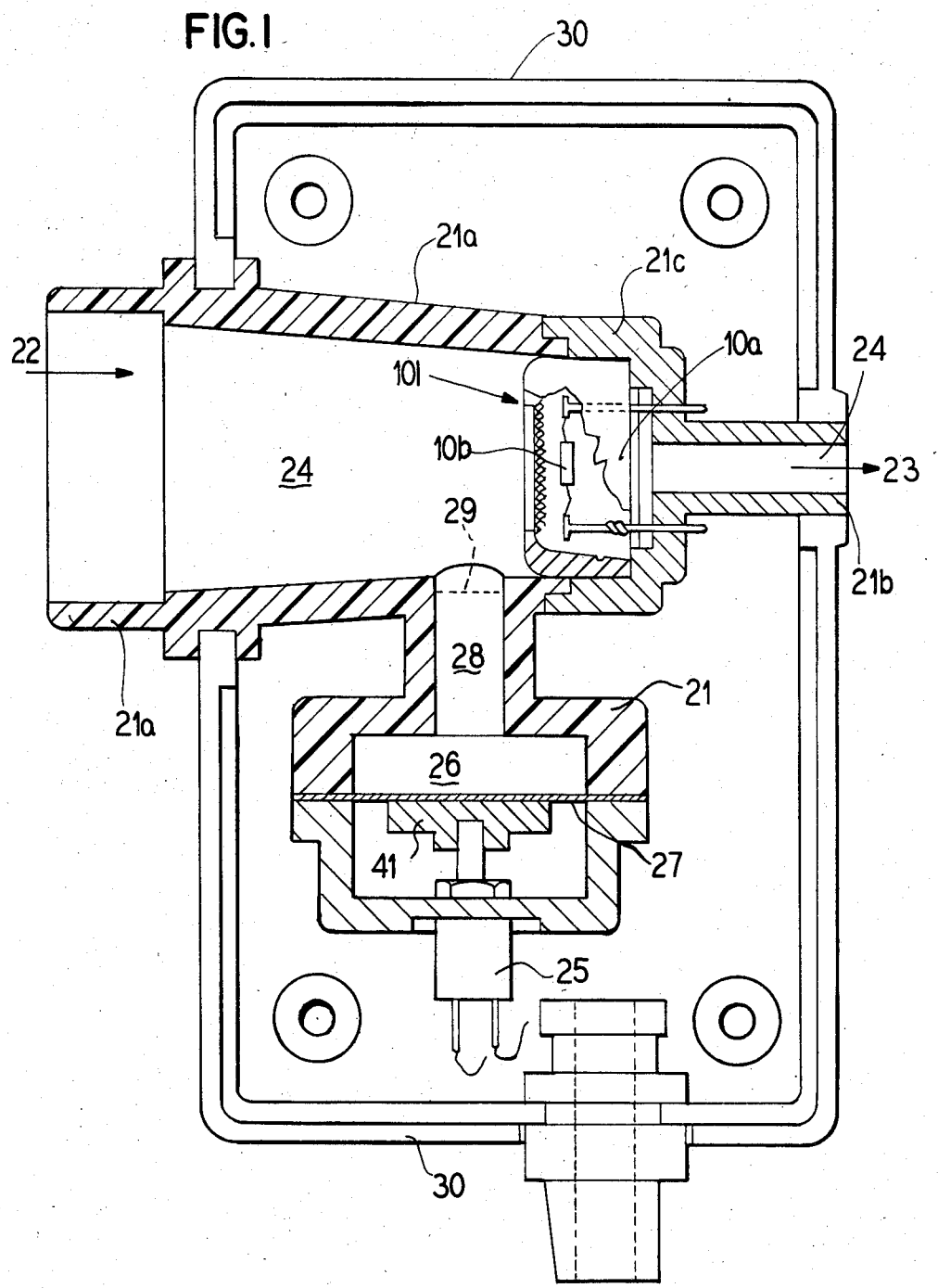
FIG. 1 is a cross-sectional view of the device without adjunct circuitry.

An alcohol detection device comprises a body 21 preferably formed from moulded plastic components. Body 21 is of an open ended configuration having an inlet 22 and an outlet 23 at opposing ends to thus assist fluid flow therethrough. Inlet 22 is preferably in the form of a mouth-piece projecting from an outer casing 30 of the device to thus facilitate a user exhaling into an interior chamber 24 between inlet 22 and outlet 23. Mounted within the interior chamber 24 is an alcohol sensor 10 which is preferably in the form of an electronic semiconductor device which incorporates a heater 32. Sensor 10 preferably has an annular shaped outer body $10^a$ with sensor head $10^b$ suspended in the interior thereof. The sensor 10 is mounted substantially axially common with the longitudinal axis of chamber 24 such that the head $10^b$ of sensor 10 is disposed clear of the surrounding body 21. This exposed mounting of the head $10^b$ facilitates air circulation through the chamber 24 and thus evaporation of any condensation formed on the interior wall of the body 21. The incorporation of the sensor 10 within the circuitry is described in more detail hereinafter.

The volumetric fluid flow capacity of the chamber 24 is larger at the inlet 22 than at the sensor 10 and/or thereafter to the outlet 23. The object of providing this restrictive configuration is to provide that with a reasonable pronounced exhalation of breath at the inlet 22 a back pressure will result within that section of the interior chamber 24 between the sensor 10 and the inlet 22. This back pressure is utilized to operate a pressure sensitive switch 25 as more particularly described hereinafter.

Preferably the body 21 is formed of two components $21^a$ and $21^b$ each of a generally cylindrical configuration. Component $21^b$ has an inner end section $21^c$ adapted to fit to the associated end of component $21^c$ and in so doing enable the mounting of sensor 10 within the interior chamber 24 in the region of the junction between the two components of the body 21. Preferably component $21^b$ substantially reduces in diameter adjacent to the junction with component $21^a$ and thereafter forms the outlet 23 of the chamber 24 in the form of a small diameter bore. This reduced size of outlet 23 together with the volumetric reduction provided by the annular shape of sensor 10 provides the desired restriction. It is envisaged that the restriction provided by the sensor 10 alone would be sufficient. By also providing that outlet 23 is of a smaller diameter reduces the surface area of the wall defining chamber 24 and thus reduces the surface on which condensation can form.

As aforesaid a pressure sensitive switch 25 is provided to be operated by back pressure in the associated section of the chamber 24. The purpose of this is to ensure that sufficient volume of exhalation breath is provided for the sensor 10 to make the measurement required of it. Unless sufficient back pressure is created in the chamber 24 switch 25 will not be operated to activate the adjunct circuitry.

As more particularly described hereinafter the circuitry also provides that switch 25 must not only be operated but also must be maintained closed for a minimum pre-determined period of time before the circuitry will provide an adequate operating signal.

Preferably switch 25 is mounted into the interior chamber 24 between inlet 22 and sensor 10 by way of an antechamber 26. A diaphragm 27 is retained by the body 21 to sealingly separate switch 25 from the interior chamber 24 and its associated antechamber 26. Diaphragm 27 thus effectively forms part of the wall defining the interior chamber 24 and will be deflected outwardly thereof with increasing pressure therewithin. Diaphragm 27 is connected to switch 25 such as by cap 41 such that deflection of diaphragm 27 depresses switch 25.

To restrict or at least limit physical tampering with switch 25 preferably antechamber 26 is conjoined to chamber 24 by a port 28. Port 28 is dimensioned and positioned to restrict physical access via the interior chamber 24 and the antechamber 26 to diaphragm 27. In addition a suitable grid or mesh element 29 could be mounted in port 28 or otherwise between diaphragm 27 and inlet 22.

Preferably outer casing 30 is provided about body 21 to provide for further physical protection of the sensor 10 and switch 25. Casing 30 also enables fixed or detachable mounting insitu and insulates the body 21 from surrounding ambient air conditions to help stabilize the condition in which the sensor 10 operates.

Figure 2:
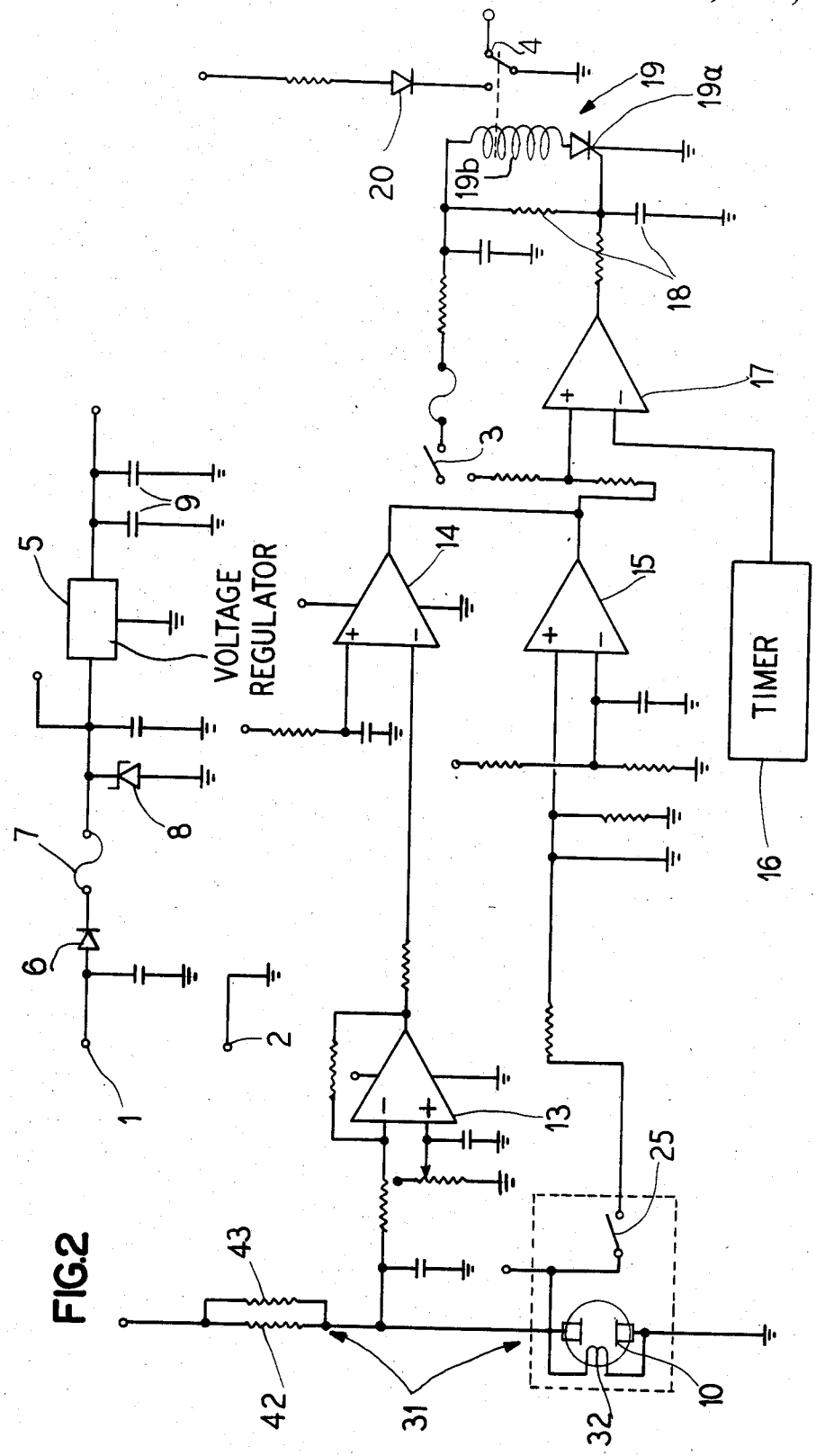
FIG. 2 is a combination circuit/block diagram of the circuitry.

Referring in particular to FIG. 2, the primary purpose of the device and its adjunct circuitry is to control an ignition circuit of a road vehicle. In FIG. 2 ignition key switch 3 and distributor points 4 represent a conventional ignition circuit of such a vehicle. In installing the device the points 4 are shorted to earth.

The circuitry is preferably powered from the automobile's battery represented by terminals 1 and 2. Preferably the circuitry incorporates a conventional stabilizing supply network comprising a voltage regulator 5 and associated protective components being diode 6, fuse 7, over voltage protection zener diode 8 and stabilizing and filtering capacitors 9. The coupling of the power supply circuit to the automobile's battery provides for a permanent supply to the circuit which is thus continuously alive.

Sensor 10 together with resistor 42 forms part of a resistive divider chain 31. Preferably a thermistor 43 and heater 32 are provided to facilitate stable and compensating temperature conditions. Sensor 10 and switch 25 have outputs to comparators 14 and 15 respectively. Preferably an inverting medium gain amplifier 13 is provided as an intermediate stage between sensor 10 and comparator 14. Comparators 14 and 15 are preferably arranged in an OR configuration with each comparator having one input thereto pre-set at a reference level. Reference voltage levels are provided to both comparators 14, 15.

Preferably the outputs of comparators 14 and 15 provide a first input to a third comparator 17 forming an input stage to ignition circuit latching means 19.

Preferably, the arrangement is such that the latching means when set removes the short provided on the points 4. The remaining input to comparator 17 is provided by a timer 16 of conventional programable structure. Timer 16 is programmed so that during a predetermined time period or periods comparator 17 provides an operating signal to the latching means 19 regardless of the level of the other input to comparator 17. Thus, the timer 16 can be programmed to maintain the latching state provided by the circuitry during those periods. It is envisaged that this facility wil be utilized during those hours when there is a minimum likelihood of use of a vehicle being made by an intoxicated driver.

The output of comparator 17, or if the comparator 17 and the associated timer 16 are not provided, the common output of comparators 14 and 15 is connected to latching means 19 controlling the ignition circuit represented by switch 3 and distributor points 4. The latching means preferably comprises a SCR $19^a$ in series with a coil $19^b$ of a relay controlled contact wired to form the short of the distributor points 4 to earth. To reset the latching means an operating signal must be provided to the gate of SCR $19^a$ to trigger the SCR and thus energise coil $19^b$. Preferably a LED 20 is provided to indicate that latching means 19 is set.

Preferably a time delay network 18 of the conventional resistive capacitor configuration is provided at the input to latching means 19. Thus an operating signal must be maintained for a period determined by the time constant of that delay network to obtain an effective operating signal to latching means 19. This ensures that not only must pressure switch 25 be operated by the exhalation pressure of a user but also switch 25 must be maintained closed for sufficient time for the capacitor of network 18 to adequately charge. Thus in using the device exhalation must not only be of adequate pressure but also for an adequate period of time for the circuitry to operate. This time delay also has the benefit that the effective measurement taken by the sensor is also after a period commensurate with the time constant of the delay circuit. This sampling delay helps provide more consistent readings as breath is essentially constant as to humidity and temperature. The sensor 10 thus tends to make the effective reading in correspondingly stabilizing conditions.

We claim:

1. A breath sample alcohol detection device comprising a body having openings at each of two opposite ends thereof and forming an interior chamber disposed between and terminating with the end openings, the portion of said body associated with a first of the end openings forming a mouthpiece and that opening conjoining directly with an inlet section of the interior chamber, the inlet section having a cross-sectional area substantially larger than the cross-sectional area of an output section of the interior chamber with the output section directly joining with the second end opening whereby an exhalation breath applied to the mouthpiece can create an increase in the fluid pressure within the inlet section of the interior chamber, a fluid pressure operative electrical switch mounted in an ante-chamber of the inlet section of the interior chamber and being sealiningly separated therefrom by a diaphragm, the pressure operative switch being set to actuate at a fluid pressure predetermined to be a pressure creatable by exhalation into the mouthpiece and an alcohol sensor having an electrically compatible output and being mounted in the inlet section of the interior chamber with the mounting suspending the sensor clear of the surrounding body.

2. A breath sample alcohol detection device and associated circuit comprising a body having openings at each of two opposite ends thereof and forming an interior chamber disposed between and terminating with the end openings, the portion of said body associated with a first of the end openings forming a mounthpiece and that opening conjoining directly with an inlet section of the interior chamber, the inlet section having a cross-sectional area substantially larger than the cross-sectional area of an output section of the interior chamber with the output section directly joining with the second end opening whereby an exhalation breath applied to the mouthpiece can create an increase in the fluid pressure within the inlet section of the interior chamber, a fluid pressure operative electrical switch mounted in an ante-chamber of the inlet section of the interior chamber and being sealingly separated therefrom by a diaphragm, the pressure operative switch being set to actuate at a fluid pressure predetermined to be a pressure creatable by exhalation into the mouthpiece and an alcohol sensor having an electrically compatible output and being mounted in the inlet section of the interior chamber with the mounting suspending the sensor clear of the surrounding body, the output of the sensor and the pressure operative switch providing separate inputs to comparator means, each input being coupled to a comparator associated therewith and each comparator also having an input at a pre-set level to thus provide a so referenced output, the comparator outputs being connected to from a control input to latching means adapted for connection into a vehicle ignition circuit, a time delay circuit connected to the control input to provide a delay between when a control signal, sufficient to activate the latching means or not, is first received by the latching means and the latching means response thereto thereby providing that the level of the output from the comparator coupled to the sensor existing at the end of the delay period is the output thereof that together with the output of the comparator associated with the pressure switch determines the control signal provided to the latching means, the circuit providing that if the sensor detects alcohol then the control signal will not effect operation of the latching means.

3. A breath sample alcohol detection device and associated circuit as claimed in claim 2 wherein a timer is incorporated into the circuit, an output of the timer and the common output of the comparators being connected as inputs to a third comparator forming the control input to the latching means whereby a time determined output of the timer will create a circuit operating state whereby the third comparator will maintain an operating signal to the latching means, the latching means comprising an SCR in series with a coil of a relay with the gate of the SCR forming the control input.

4. A vehicle ignition control circuit comprising an alcohol sensor and a fluid pressure operative switch providing separate inputs to comparator means, the sensor and pressure switch being mounted in a device providing a breath exhalation receiving chamber common to each whereby a breath sample monitored by the sensor must also generate sufficient pressure to operate the pressure switch to achieve the respective inputs, each input being coupled to a comparator associated therewith and each comparator also having an input at a pre-set level to thus provide a so referenced output, the comparator outputs being connected to form a control input to latching means connectable into a vehicle ignition circuit, a time delay circuit connected to the control input to provide a delay between when a control signal, sufficient to activate the latching means or not, is first received by the latching means and the latching means response thereto thereby providing that the level of the output from the comparator coupled to the sensor existing at the end of the delay period is the output thereof that together with the output of the comparator associated with the pressure switch determines the control signal provided to the latching means, the circuit providing that if the sensor detects alcohol then the control signal will not effect operation of the latching means.

5. A vehicle ignition control circuit as claimed in claim 4 wherein a timer is incorporated into the circuit, the output of the timer and the common output of the comparator being connected as inputs to a third comparator forming the control input to the latching means whereby a time determined output of the timer will create a circuit operating state whereby the third comparator will maintain an operating signal to the latching means, the latching means comprising an SCR in series with a coil of a relay with the gate of the SCR forming the control input.

* * * * *